United States Patent [19]

Pease

[11] 3,784,791

[45] Jan. 8, 1974

[54] OPTICAL ADDRESSING SYSTEM

[75] Inventor: Logan L. Pease, Bountiful, Utah

[73] Assignee: Eaton Corporation, Cleveland, Ohio

[22] Filed: July 29, 1971

[21] Appl. No.: 167,315

[52] U.S. Cl. .............. 235/61.11 E, 198/38, 200/46, 235/61.12 R, 340/146.3 K

[51] Int. Cl.. G06k 19/04, B65g 43/08, H01h 43/08

[58] Field of Search ................G06k 7/14; 200/46; 235/61.7 B, 61.11 A, 61.11 B, 61.11 E, 61.12 R, 61.9 R; 198/38; 340/149 A, 146.3 K

[56] References Cited

UNITED STATES PATENTS

| | | | |
|---|---|---|---|
| 3,644,713 | 2/1972 | Hayakawa | 235/61.9 R |
| 3,053,415 | 9/1962 | Pennington | 235/61.7 B |
| 3,125,672 | 3/1964 | Kull | 200/46 |
| 3,243,532 | 3/1966 | Bonduwe | 200/46 |
| 3,443,068 | 5/1969 | Tucker | 235/61.11 E |
| 3,227,886 | 1/1966 | Dunigan | 198/38 |
| 3,502,851 | 3/1970 | Kakimoto | 235/61.12 R |
| 3,074,353 | 1/1963 | Devonshire | 198/38 |
| 3,203,530 | 8/1965 | Sgriccia | 198/38 |
| 3,308,378 | 3/1967 | Murray | 200/46 |
| 3,316,392 | 4/1967 | Bailey | 235/61.12 N |
| 3,617,707 | 11/1971 | Shields | 235/61.11 E |
| 3,277,283 | 10/1966 | Rabinow | 340/146.3 K |
| 3,016,456 | 1/1962 | Corporon | 340/146.3 K |

*Primary Examiner*—Maynard R. Wilbur
*Assistant Examiner*—Robert M. Kilgore
*Attorney*—Lynn G. Foster

[57] ABSTRACT

An optical addressing system for an automatically controlled vehicle comprising a plurality of opaque address plates mounted at appropriate locations along possible paths of movement of the vehicle, the plates each being formed with a pair of elongated strobe-indicating bars located at respective ends of the plate to provide optically readable strobe signals and a plurality of shorter bars and spaces disposed intermediate the strobe-indicating bars cooperating to provide an optically readable address signal, and photoelectric means carried by the vehicle for sensing the optically readable signals provided by the address plates.

5 Claims, 3 Drawing Figures

OPTICAL ADDRESSING SYSTEM

BACKGROUND

1. Field of Invention

This invention relates to automatic vehicle control systems and is particularly directed to optical addressing systems for indicating the location of automatically controlled vehicles, such as stacker cranes and the like.

2. Prior Art

In the automatic control of vehicles, such as stacker cranes and the like, command signals are frequently originated by a computer or other control means located remote from the vehicle. Under these circumstances, some means must be provided for indicating the position of the controlled vehicle to the command source. Numerous techniques have been proposed, heretofore, for accomplishing this. However, none of the prior art techniques have been entirely satisfactory. Some of the prior art addressing systems have provided location indications only when the vehicle was at rest. Other systems have provided regional, rather than specific, location indications. Still other prior art systems have provided location indications which could be employed for gross control of the vehicle, but which were of little or no use for fine positioning of the vehicle. Additional systems have provided position indications which were not compatible with computer control. Other systems have been complex and expensive.

BRIEF SUMMARY AND OBJECTS OF THE INVENTION

These disadvantages of the prior art are overcome with the present invention and an addressing system is provided which is simple and relatively inexpensive, yet is compatible with computer control and provides accurate, reliable location indications which may be employed for both gross and fine positioning of the controlled vehicle.

The advantages of the present invention are preferably attained by providing a plurality of opaque address plates mounted at appropriate vertical and horizontal positions along the possible paths of the controlled vehicle, together with optical reader heads carried by the controlled vehicles and positioned to sense the data supplied by the address plates. The address plates are formed to cooperate with the reader heads to provide a digital location signal together with a pair of strobe signals, each at a respective end of the address plate.

Accordingly, it is an object of the present invention to provide an improved addressing system for automatic control of vehicles.

Another object of the present invention is to provide an addressing system for automatic control of vehicles, which may be employed for both gross and fine positioning of the vehicles.

A further object of the present invention is to provide an addressing system for automatic control of vehicles which is compatible with computer control of such vehicles.

An additional object of the present invention is to provide an addressing system for automatic control of vehicles which is simple and relatively inexpensive.

A specific object of the present invention is to provide an addressing system for automatic control of vehicles comprising a plurality of opaque address plates mounted at appropriate vertical and horizontal positions along the possible paths of the controlled vehicle, together with optical reader heads carried by the vehicles and positioned to sense the data supplied by the address plates, wherein the address plates are formed to cooperate with the reader heads to provide a digital location signal together with a pair of strobe signals, each at a respective end of the address plate.

These and other objects and features of the present invention will be apparent from the following detailed description, taken with reference to the accompanying drawing.

DETAILED DESCRIPTION OF THE ILLUSTRATED EMBODIMENT

Figure 1:
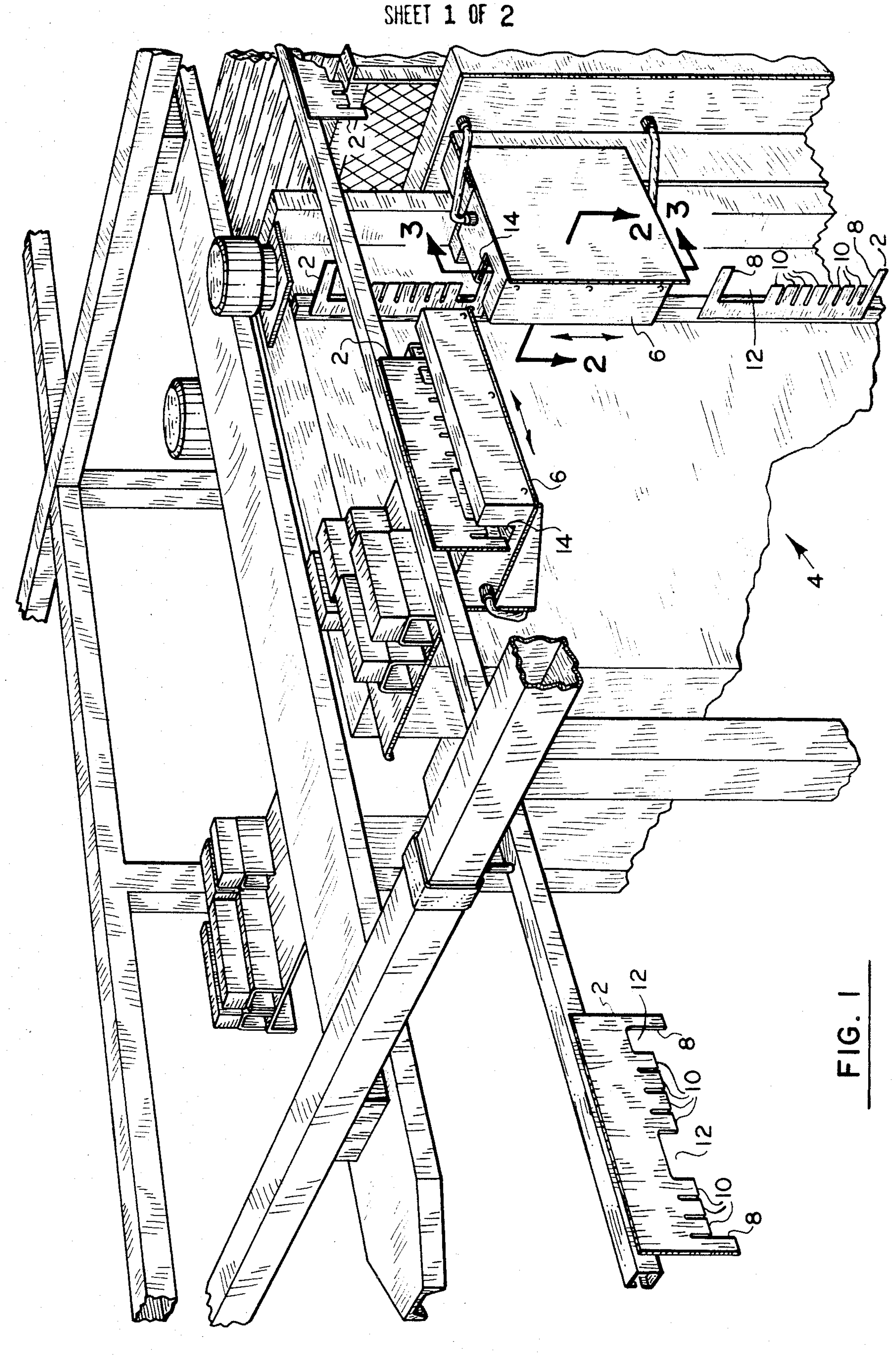
FIG. 1 is a diagrammatic representation of an addressing system embodying the present invention.

In that form of the present invention chosen for purposes of illustration, FIG. 1 shows a plurality of opaque address plates 2 mounted at appropriate horizontal and vertical positions along possible paths of movement of a controlled vehicle, indicated generally at 4, and positioned to be sensed by reader heads 6 carried by the vehicle 4.

Each of the address plates 2 is formed with elongated bars 8 at each end thereof and is formed intermediate the bars 8 with a plurality of relatively short bars 10 and spaces 12. The short bars 10 and spaces 12 cooperate to provide an optically readable address. Obviously, the positions of the bars 10 and spaces 12 will be different for each of the address plates 2. Moreover, while the total number of possible bars 10 and spaces 12 will be fixed for any given installation, it will be apparent that this number can be altered for different installations.

Figure 2:
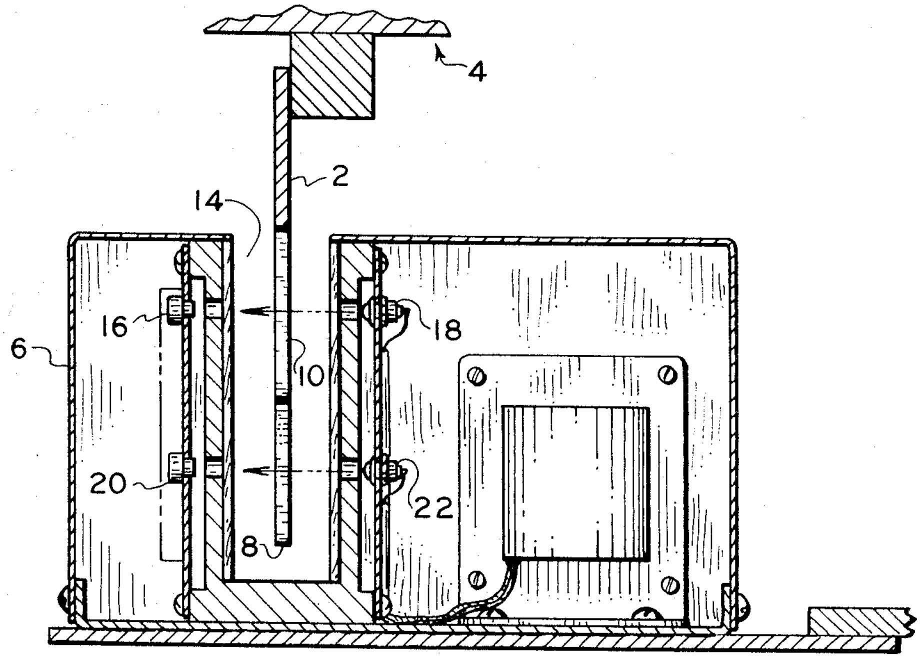
FIG. 2 is a longitudinal section through one of the reader heads of the addressing system of FIG. 1, taken on the line 2—2 thereof.
Figure 3:
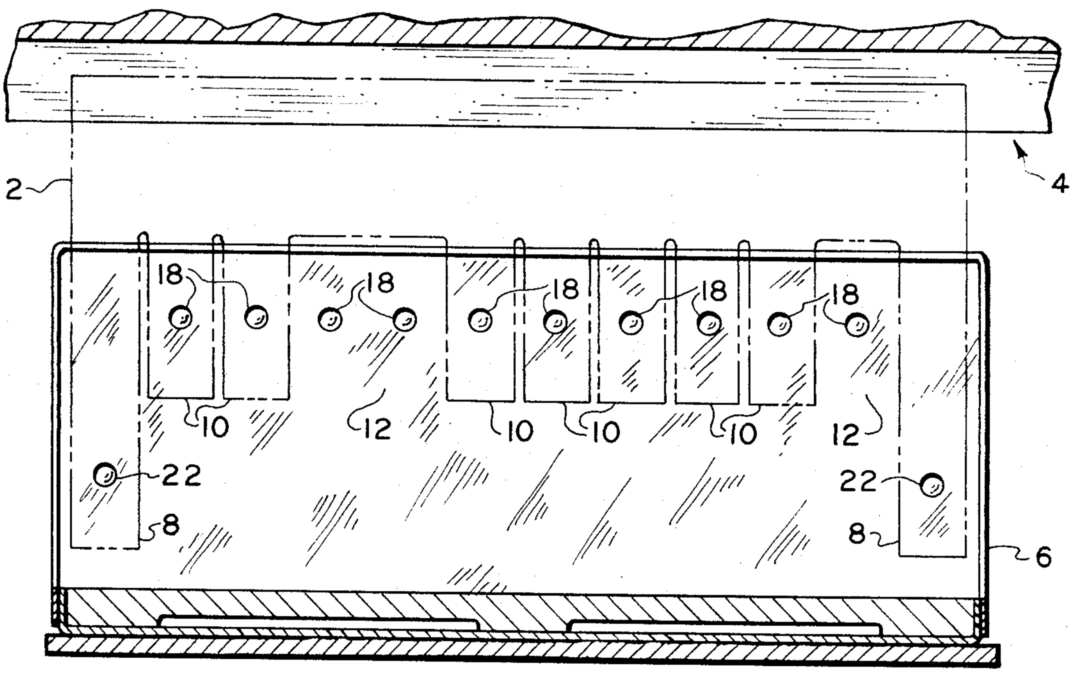
FIG. 3 is a transverse section through one of the reader heads of the addressing system of FIG. 1, taken on the line 3—3 thereof.

As best seen in FIGS. 2 and 3, the reader heads 6 are each formed with a longitudinal slot 14 extending therethrough which permits passage of the reader heads 6 about the address plates 2, during movement of the vehicle 4, to permit the reader heads 6 to sense the location data provided by the address plates 2. Each of the reader heads 6 carries a row of photoelectric cells 16, or the like, located along one side of the slot 14 in position to sense the short bars 10 and spaces 12. In addition, a corresponding row of light sources 18 are carried by the reader head 6 and are disposed along the opposite side of the slot 14. Two strobe-sensing photoelectric cells 20 are provided adjacent respective ends of slot 14 of the reader head 6 and are slightly offset from the row of photoelectric cells 16. Also, a pair of light sources 22 are positioned on the opposite side of the slot 14 in locations corresponding to the strobe-sensing cells 20. The strobe-sensing cells 20 are disposed so as to sense only the strobe bars 10 of the address plate 2.

In use, when the vehicle 4 is commanded to travel to a particular address, the vehicle is driven at high speed until it approaches the desired address. During travel, the reader heads 6 will be moved past a plurality of the address plates 2. When this happens, passage of the strobe-sensing photocell 20 at the leading end of the reader head 6 by the strobe indicator bar 8 at the adjacent end of an approaching address plate 2 will serve to arm the reader head 6. Subsequently, when the strobe-sensing photocell 20 at the leading end of the reader head 6 encounters the second strobe indicator bar 8 of the plate 2, the strobe-sensing photocell 20 at the trailing end of the reader head 6 will be encountering the first strobe-indicator bar 8 of the plate 2. Thus, the signals of both of the strobe-sensing photocells 20 will be interrupted. This provides a "Read Now" signal to the intermediate photocells 16 of the reader head 6 which, then, sense the address signal formed by the short bars 10 and spaces 12 of the address plate 2. This sensed address signal is passed to the vehicle control system which compares it with the commanded address. When the sensed address signal is adjacent the commanded address, the control system slows the vehicle 4, to a "creep" speed and, subsequently, when the sensed address corresponds to the commanded address, halts further movement of the vehicle 4. Should the vehicle stop in a position such that the two strobe indicator bars 8 of the address plate 2 are not in registry with the strobe-sensing photocells 20 of the reader head 6, the control system may command the vehicle 4 to move forward or backward at creep speed until such registry is obtained, whereupon the vehicle 4 will be precisely located at the commanded position.

Obviously, numerous variations and modifications may be made without departing from the present invention. Accordingly, it should be clearly understood that the form of the present invention described above and shown in the accompanying drawing is illustrative only and is not intended to limit the scope of the invention.

What is claimed is:

1. An addressing system for an automatically controlled vehicle comprising:

a light source;

a plurality of address plates each mounted at respective appropriate locations along possible paths of movement of said vehicle, each of said address plates being formed of a flat sheet of opaque material to have an elongated bar at each end thereof and a plurality of shorter bars and spaces disposed intermediate said elongated bars, said elongated bars and said shorter bars and spaces cooperating to produce an optically readable address signal and an optically readable "Read Now" signal when said plate is illuminated by said light source;

a reader head carried by said vehicle and having an elongated slot extending through said head positioned to pass about said address plates during movement of said vehicle; and a plurality of photoelectric means on said reader head corresponding in number to the number of bars and spaces on each of said address plates and communicating with said slot to optically read said address signal provided by each of said address plates upon detection of said "Read Now" signal from said address plates and converting said address signal into electrical signals.

2. The addressing system of claim 1 wherein:

said means for optically reading comprises photoelectric means.

3. The addressing system of claim 1 wherein said photoelectric means comprises:

a row of photoelectric devices disposed along one side of said slot and positioned to sense said optically readable address signal, and a pair of photoelectric devices located adjacent respective ends of said reader head and positioned to sense only said optically readable "Read Now" signals.

4. The addressing system of claim 3 further comprising;

a plurality of light sources each positioned to correspond to a respective one of said photoelectric devices and mounted on the opposite side of said slot from said photoelectric devices.

5. An addressing system for an automatically controlled vehicle comprising:

a light source;

a plurality of address plates mounted at stationary locations along the path of vehicle travel and formed of a flat sheet of opaque material having an elongated bar formed at each end of each address plate and a plurality of shorter bars and spaces disposed intermediate said elongated bars, said elongated bars and said shorter bars and spaces cooperating to produce an optically readable address signal and an optically readable "Read Now" signal when said plate is illuminated by said light source;

a reader head carried by said vehicle and having a plurality of photoelectric means corresponding to said shorter bars and spaces on said plate for sensing said optically readable address signal, said reader head also having means for detecting said elongated bars to actuate said "Read Now" signal only upon alignment of said reader head with said address signal of said plate; and said reader head sensing said optically readable address signal only upon detection of said "Read Now" signal.

* * * * *